US012522008B2

(12) United States Patent
Fujiwara

(10) Patent No.: US 12,522,008 B2
(45) Date of Patent: Jan. 13, 2026

(54) WINDING DEVICE AND PRINTING DEVICE HAVING REGULATING PORTION FOR REGULATING THE SWING OF A TENSION BAR

(71) Applicant: SEIKO EPSON CORPORATION, Tokyo (JP)

(72) Inventor: Daisuke Fujiwara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 188 days.

(21) Appl. No.: 18/477,268

(22) Filed: Sep. 28, 2023

(65) Prior Publication Data

US 2024/0109346 A1 Apr. 4, 2024

(30) Foreign Application Priority Data

Sep. 29, 2022 (JP) ................................ 2022-155981

(51) Int. Cl.
*B41J 15/16* (2006.01)
*B41J 13/00* (2006.01)

(52) U.S. Cl.
CPC ............ *B41J 15/16* (2013.01); *B41J 13/0036* (2013.01); *B41J 15/165* (2013.01)

(58) Field of Classification Search
CPC ....... B41J 15/16; B41J 13/0036; B41J 15/165
See application file for complete search history.

(56) References Cited

U.S. PATENT DOCUMENTS

2019/0299679 A1* 10/2019 Ushiama ................. B41J 11/02

FOREIGN PATENT DOCUMENTS

JP 2013-078953 A 5/2013

* cited by examiner

*Primary Examiner* — Henok D Legesse
(74) *Attorney, Agent, or Firm* — WORKMAN NYDEGGER

(57) ABSTRACT

A winding unit that winds an intermittently conveyed medium includes a winding roller that winds the medium, a winding roller driving mechanism that applies a driving force for rotating the winding roller, a winding bar member that is swingably provided upstream from the winding roller and applies tension to the medium by pressing the medium, and an abutting portion that regulates swing of the winding bar member.

9 Claims, 7 Drawing Sheets

WINDING DEVICE AND PRINTING DEVICE HAVING REGULATING PORTION FOR REGULATING THE SWING OF A TENSION BAR

The present application is based on, and claims priority from JP Application Serial Number 2022-155981, filed Sep. 29, 2022, the disclosure of which is hereby incorporated by reference herein in its entirety.

BACKGROUND

1. Technical Field

The present disclosure relates to a winding device and a printing device.

2. Related Art

A winding device that winds a medium intermittently conveyed by a conveying portion around a winding roller is known. In such a winding device, by applying appropriate tension to the medium, the slack of the medium is inhibited, and a winding deviation at the time of winding is inhibited. On the other hand, in a device that winds a medium fed out from large-diameter roll paper, it is difficult to instantaneously apply much tension in synchronization with intermittent conveyance. For this reason, as shown in JP-A-2013-78953, a winding device that can continuously apply substantially constant tension by swinging a tension bar around which a medium is wound upstream from a winding roller to change a conveyance path length is conceivable.

As roll paper has a larger diameter, the slack of a medium is more likely to be generated, and thus, for example, it is desirable to apply more tension during the stop of conveyance than during the conveyance to inhibit the slack. However, in the configuration in which the tension bar is swung as in JP-A-2013-78953, when much tension is applied to the medium, the tension bar may move without being able to withstand the tension. In addition, when the medium moves in a conveying direction due to the movement of the tension bar, the medium is wound around the winding roller while more tension than during normal conveyance is applied, and wrinkles may occur in the medium.

SUMMARY

A winding device is a winding device that winds an intermittently conveyed medium, and is characterized by including a winding roller that winds the medium, a winding driving portion that applies a driving force for rotating the winding roller, a tension bar that is swingably provided upstream from the winding roller and applies tension to the medium by pressing the medium, and a regulating portion that regulates swing of the tension bar.

A printing device is characterized by including a conveying portion that intermittently conveys a medium, a printing portion that performs printing on the medium, a winding roller that winds the medium on which printing is performed, a winding driving portion that applies a driving force for rotating the winding roller, a tension bar that is swingably provided upstream from the winding roller and applies tension to the medium by pressing the medium, and a regulating portion that regulates swing of the tension bar.

DESCRIPTION OF EMBODIMENTS

1. First Embodiment

A printer 10 of a first embodiment will be described below.

Figure 1:
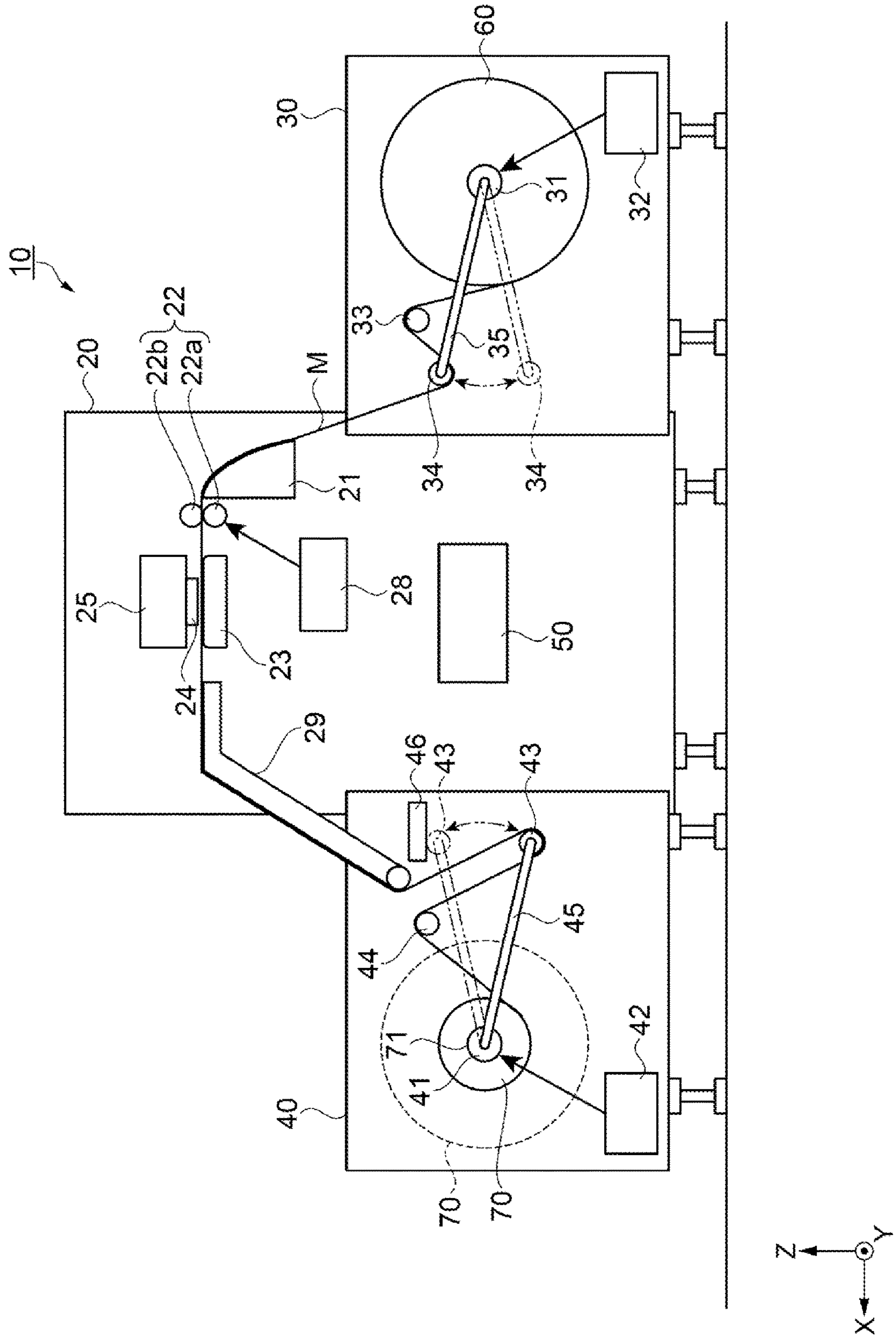
FIG. 1 is a schematic cross-sectional view showing a configuration of a printer according to a first embodiment.

FIG. 1 is a schematic cross-sectional view showing the configuration of the printer 10 of the first embodiment.

As shown in FIG. 1, the printer 10 is an ink jet printer that performs printing by discharging liquid ink onto a medium M. The printer 10 includes a printing unit 20 that performs printing on an elongated medium M, a supply unit 30 that feeds the medium M to the printing unit 20, and a winding unit 40 that winds the medium on which printing is performed M. The printer 10 corresponds to a printing device, and the winding unit 40 corresponds to a winding device.

FIG. 1 shows an X axis, a Y axis and a Z axis which are orthogonal to each other. The X axis is parallel to an installation surface of the printer 10 and corresponds to a width direction of the printer 10. The Y axis is parallel to the installation surface of the printer 10, corresponds to a depth direction of the printer 10, and corresponds to a width direction of the medium M. The Z axis is perpendicular to the installation surface of the printer 10 and corresponds to a height direction of the printer 10.

Hereinafter, a +X direction parallel to the X axis is a direction from the supply unit 30 toward the winding unit 40. In the case of FIG. 1, the +X direction is a leftward direction in the figure. A −X direction parallel to the X axis is a direction opposite to the +X direction. A +Y direction parallel to the Y axis is a direction from the back to the front of the printer 10 when the winding unit 40 is disposed leftward from the supply unit 30. In the case of FIG. 1, the +Y direction is a direction toward the front of the figure. A −Y direction parallel to the Y axis is a direction opposite to the +Y direction. A +Z direction parallel to the Z axis is an upward direction from the installation surface of the printer 10. In the case of FIG. 1, the +Z direction is a direction toward the top of the figure. A −Z direction parallel to the Z axis is a direction opposite to the +Z direction.

The printing unit 20 includes a supply guide frame 21, a conveying roller pair 22, a platen 23, a print head 24, a carriage 25, a conveying roller driving mechanism 28, a discharge guide frame 29, and a control unit 50.

The supply guide frame 21 guides the medium M fed from the supply unit 30 to the conveying roller pair 22. The supply guide frame 21 guides the medium M in an oblique direction having a +X component and a +Z component. That is, the supply guide frame 21 may be configured of one member, or may be configured of a plurality of members.

The conveying roller pair 22 includes a first conveying roller 22*a* and a second conveying roller 22*b*, and conveys the medium M. The first conveying roller 22*a* is disposed on the −Z side with respect to the medium M, and the second conveying roller **22*b* is disposed on the +Z side with respect to the medium M. The first conveying roller 22*a* or the second conveying roller 22*b* is rotationally driven by a driving force from the conveying roller driving mechanism 28. The first conveying roller 22*a* and the second conveying roller 22*b* are pressed against each other to nip the medium M therebetween, and convey the medium M in the +X direction in which the print head 24 is located due to rotational driving of one of the rollers. The conveying roller pair 22 and the conveying roller driving mechanism 28** correspond to a conveying portion.

The platen 23 is provided at a position in the −Z direction with respect to the print head 24. The platen 23 is a flat plate-shaped member that supports the medium M conveyed by the conveying roller pair 22. Also, a suction fan may be provided at a position in the −Z direction with respect to the platen 23. In this case, the platen 23 is provided with through holes for circulating airflow, and the medium M is attracted to the platen 23 by the airflow of the suction fan.

The print head 24 performs image forming, that is, printing, on the medium M supported by the platen 23. The print head 24 of this embodiment is an ink jet head in which a plurality of nozzles are formed, and forms an image on the medium M by ejecting ink from the nozzles to the medium M based on a drive signal output from a print head driving mechanism 61 (see FIG. 2). The print head 24 corresponds to a printing portion.

The carriage 25 supports the print head 24. The carriage 25 can reciprocate along the Y axis by being driven by a carriage driving mechanism 62 (see FIG. 2). When the carriage 25 is moving over the medium M along the Y axis, the print head 24 ejects ink onto the medium M, thereby forming an image along the Y axis. In addition, by alternately repeating the operation of forming an image along the Y axis and the operation of conveying the medium M in the +X direction by a predetermined amount, an image is formed over a wide range of the medium M. In other words, the printing unit 20 repeats the operation of conveying the medium M in the +X direction and the operation of stopping the conveyance of the medium M, and performs printing when the conveyance of the medium M is stopped. That is, the medium M is intermittently conveyed in the +X direction by the conveying roller pair 22 and the conveying roller driving mechanism 28.

The discharge guide frame 29 guides the medium M printed on by the print head 24 to the winding unit 40. The discharge guide frame 29 guides the medium M in an oblique direction having a +X component and a −Z component. The discharge guide frame 29 may be configured of one member, or may be configured of a plurality of members.

Also, a drying unit may be provided at a position opposite to the discharge guide frame 29 with the medium M interposed therebetween. The drying unit includes, for example, a heater serving as a heating source. The drying unit heats the medium M on the discharge guide frame 29 and promotes fixation of the discharged ink to the medium M.

The control unit 50 performs various types of control such as conveyance control of the medium M and printing control on the medium M. For example, the control unit 50 acquires printing data from an external computer (not shown) or the like and performs printing control based on the acquired printing data. The control unit 50 may be configured of one or a plurality of units. Details of the control unit 50 will be described later.

The supply unit 30 includes a supply roller 31, a supply roller driving mechanism 32, a supply guide member 33, a supply bar member 34, and a first arm 35. A medium roll 60 around which the elongated medium M is wound in a roll shape is mounted in the supply unit 30.

The supply roller 31 extends along the Y axis and supports the medium roll 60. The supply roller 31 is rotatable around a rotation axis provided along the Y axis, and feeds the medium M from the medium roll 60 toward the printing unit 20 by rotating clockwise in the side view of FIG. 1. The supply roller 31 is rotatably supported by frames or the like (not shown) disposed at an end portion of the supply unit 30 in the +Y direction and an end portion thereof in the −Y direction.

The supply roller driving mechanism 32 applies a driving force for rotating the supply roller 31 to the supply roller 31 based on control of the control unit 50. The supply roller driving mechanism 32 includes a driving source such as a motor (not shown), a transmission mechanism that transmits a driving force from the driving source, and a control circuit that operates the driving source based on a control signal from the control unit 50.

The supply guide member 33 and the supply bar member 34 extend along the Y axis similarly to the supply roller 31. That is, the supply guide member 33 and the supply bar member 34 extend along the rotation axis of the supply roller 31. Specifically, the supply guide member 33 and the supply bar member 34 are parallel to the rotation axis of the supply roller 31. The supply guide member 33 and the supply bar member 34 can be configured of, for example, extrusion molded members or pipe processed members formed by using a metal material such as aluminum or SUS, or may be configured by elastic members so that they can come into contact with the medium M without gaps.

The supply guide member 33 is, for example, a cylindrical member and is disposed on the +X side of the supply roller 31. Before being printed on by the printing unit 20, the medium M that has been fed from the supply roller 31 is wound around the supply guide member 33. The supply guide member 33 guides the wound medium M in an oblique direction having a +X component and a −Z component. The supply guide member 33 comes into contact with the medium M directly or via a cover member (not shown). The supply guide member 33 is non-rotatably supported by a frame or the like (not shown). However, the supply guide member 33 may be configured to be rotatably supported by a frame or the like (not shown) and to rotate in accordance with the conveyance of the medium M.

The supply bar member 34 is disposed on the +X side of the supply guide member 33, and the medium M guided and conveyed by the supply guide member 33 is wound around the supply bar member 34. The supply bar member 34 applies tension to the medium M by pressing the medium M. The supply bar member 34 guides the medium M in an oblique direction having a +X component and a +Z component so that the wound medium M is conveyed to the conveying roller pair 22 via the supply guide frame 21. The supply bar member 34 comes into contact with the medium M directly or via a cover member (not shown). A shape of the supply bar member 34 is not limited as long as it is possible to apply tension to the medium M, but its shape is preferably cylindrical.

One end of the first arm 35 is rotatably coupled to the supply bar member 34 at an end portion thereof in the +Y direction and an end portion thereof in the −Y direction. The first arm 35 rotatably supports the supply bar member 34. The other end of the first arm 35 is coupled to a rotation shaft coaxial with the rotation axis of the supply roller 31. The first arm 35 rotates around the rotation shaft, and thus the supply bar member 34 is swingable in the ±Z direction. Specifically, when the medium M is conveyed in the +X direction in the printing unit 20, the supply bar member 34 moves in the +Z direction while applying tension to the medium M due to its own weight. On the other hand, when the conveyance of the medium M is stopped in the printing unit 20, the supply bar member 34 moves in the −Z direction while applying tension to the medium M due to its own weight. Also, the first arm 35 may non-rotatably support the supply bar member 34. Further, the rotation shaft to which the other end of the first arm 35 is coupled does not need to be coaxial with the rotation axis of the supply roller 31 and may be disposed at a different position.

The winding unit 40 includes a winding roller 41, a winding roller driving mechanism 42, a winding bar member 43, a winding guide member 44, a second arm 45, and an abutting portion 46. The winding unit 40 winds the medium M intermittently conveyed from the printing unit 20, that is, the medium M printed on by the printing unit 20.

The winding roller 41 is a cylindrical roller extending along the Y axis and winds the medium M after printing that is conveyed around a roll core 71 mounted in the winding roller 41. That is, the winding roller 41 is rotatable around a rotation axis provided along the Y axis and rotates clockwise in the side view of FIG. 1 to wind the medium M printed on by the printing unit 20 around the roll core 71. The medium M wound around the roll core 71 becomes a print medium roll 70 having a roll shape, and a roll diameter, that is, a diameter, of the print medium roll 70 increases as the winding proceeds. The print medium roll 70 indicated by a broken line in FIG. 1 shows a state in which the entire medium M is wound. The winding roller 41 is rotatably supported by a frame or the like (not shown) disposed at an end portion of the winding unit 40 in the +Y direction and an end portion thereof in the −Y direction. Also, the present disclosure is not limited to the configuration in which the medium M is wound around the roll core 71, and a configuration in which the medium M is directly wound around the winding roller 41 may be employed.

The winding roller driving mechanism 42 applies a driving force for rotating the winding roller 41 to the winding roller 41 based on control of the control unit 50. The winding roller driving mechanism 42 includes a driving source such as a motor (not shown), a transmission mechanism that transmits a driving force from the driving source, and a control circuit that operates the driving source based on a control signal from the control unit 50. The winding roller driving mechanism 42 causes the winding roller 41 to wind the medium M by rotating the winding roller 41. In addition, the winding roller driving mechanism 42 has a torque limit function, and when a torque required for winding reaches a predetermined upper limit value, driving is continued while the torque is maintained at the upper limit value. The winding roller driving mechanism 42 corresponds to a winding driving portion.

Similarly to the winding roller 41, the winding bar member 43 and the winding guide member 44 extend along the Y axis. That is, the winding bar member 43 and the winding guide member 44 extend along the rotation axis of the winding roller 41. Specifically, the winding bar member 43 and the winding guide member 44 are parallel to the rotation axis of the winding roller 41. The winding bar member 43 and the winding guide member 44 can be configured by, for example, extrusion molded members or pipe processed members formed using a metal material such as aluminum or SUS, but may be configured by elastic members so that they can come into contact with the medium M without gaps.

The winding bar member 43 is disposed upstream from the winding roller 41, that is, on the −X side of the winding roller 41, and the medium M printed on by the print head 24 is wound around the winding bar member 43. The winding bar member 43 applies tension to the medium M by pressing the medium M. The winding bar member 43 guides the wound medium M toward the winding guide member 44 in an oblique direction having a +X component and a +Z component. The winding bar member 43 comes into contact with a printing surface of the medium M directly or via a cover member (not illustrated). A shape of the winding bar member 43 is not limited as long as it is possible to apply tension to the medium M, and its shape is preferably cylindrical. The winding bar member 43 corresponds to a tension bar.

One end of the second arm 45 serving as an arm is coupled to the winding bar member 43 at an end portion thereof in the +Y direction and an end portion thereof in the −Y direction. The second arm 45 rotatably supports the winding bar member 43. The other end of the second arm 45 is coupled to a rotation shaft coaxial with the rotation axis of the winding roller 41. The second arm 45 rotates around the rotation shaft, and thus the winding bar member 43 is swingable in the ±Z direction. Specifically, when the medium M is conveyed in the +X direction in the printing unit 20, the winding bar member 43 moves in the −Z direction while applying tension to the medium M due to its own weight. On the other hand, when the conveyance of the medium M is stopped in the printing unit 20, the winding bar member 43 moves in the +Z direction while applying tension to the medium M due to its own weight. Also, the second arm 45 may non-rotatably support the winding bar member 43. In addition, the rotation shaft to which the other end of the second arm 45 is coupled does not need to be coaxial with the rotation axis of the winding roller 41 and may be disposed at a different position.

The winding guide member 44 is, for example, a cylindrical member and is disposed on the +X side of winding bar member 43 and on the −X side of winding roller 41. That is, the winding guide member 44 is disposed between the winding bar member 43 and the winding roller 41 in the ±X direction. The medium M that has passed through the winding bar member 43 before being wound by the winding roller 41 is wound around the winding guide member 44. The winding guide member 44 guides the wound medium M toward the winding roller 41 in an oblique direction having a +X component and a −Z component. The winding guide member 44 comes into contact with a back surface of the medium M, that is, a surface on a side opposite to the printing surface, directly or via a cover member (not shown). The winding guide member 44 is non-rotatably supported by a frame or the like (not shown). However, the winding guide member 44 may be configured to be rotatably supported by a frame or the like (not shown) and to rotate in accordance with the conveyance of the medium M.

The abutting portion 46 is a member supported by a frame or the like (not shown) and is disposed on the +Z side of a swing range of the winding bar member 43. Specifically, the abutting portion 46 is disposed at a position at which the abutting portion 46 can abut the winding bar member 43 in the process in which the winding bar member 43 moves in the +Z direction. The abutting portion 46 abuts the winding bar member 43 to regulate the swing of the winding bar member 43. In addition, by regulating the swing, the conveyance of the medium M from the winding bar member 43 toward the winding roller 41 is regulated. The abutting portion 46 corresponds to a regulating portion. The abutting portion 46 abuts at least one of an end portion of the winding bar member 43 in the +Y direction and an end portion of the winding bar member 43 in the −Y direction not to interfere with the medium M conveyed from the discharge guide frame 29. Also, the abutting portion 46 is not limited to a form in which the abutting portion 46 abuts the winding bar member 43 itself. For example, it may have a form of abutting a member coupled to the winding bar member 43 like the second arm 45. In this case, the member abutting the abutting portion 46 corresponds to a first member. Further, a shape of the abutting portion 46 is not limited as long as the abutting portion 46 can regulate the swing of the winding bar member 43.

Figure 2:
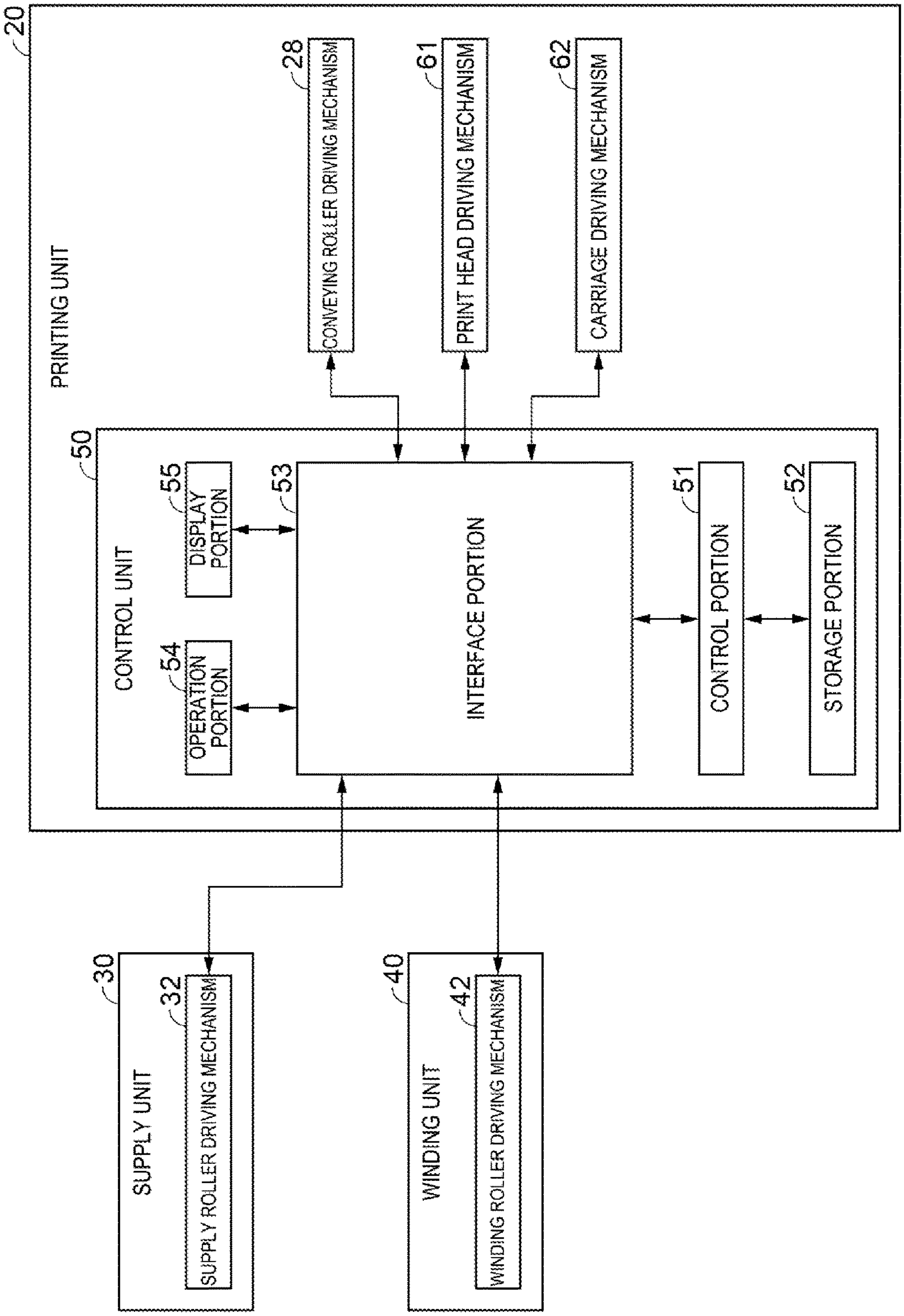
FIG. 2 is a block diagram showing a configuration of the printer.

FIG. 2 is a block diagram showing a configuration of the printer 10.

As shown in FIG. 2, the control unit 50 includes a control portion 51, a storage portion 52, an interface portion 53, an operation portion 54, and a display portion 55. The storage portion 52 and the interface portion 53 are coupled to the control portion 51.

The control portion 51 has a processor such as a central processing unit (CPU). The control portion 51 controls various operations of the printer 10 by operating in accordance with a control program (not shown) stored in the storage portion 52.

The storage portion 52 includes a semiconductor memory such as a read only memory (ROM) or a random access memory (RAM), or a storage such as a hard disk drive (HDD) or a solid state drive (SSD). The storage portion 52 stores various pieces of information together with the control program described above.

Each driving mechanism included in the printer 10 is coupled to the interface portion 53. Specifically, the interface portion 53 is coupled to the conveying roller driving mechanism 28, the print head driving mechanism 61, and the carriage driving mechanism 62 of the printing unit 20, to the supply roller driving mechanism 32 of the supply unit 30, and to the winding roller driving mechanism 42 of the winding unit 40. The control unit 51 transmits control signals to these driving mechanisms via the interface portion 53 to control operations of each driving mechanism.

The operation portion 54 and the display portion 55 are coupled to the interface portion 53. The operation portion 54 is configured by operation buttons and the like, receives an input operation performed by a user, and transmits information corresponding to the input operation to the control portion 51. The display portion 55 is configured by, for example, a display device such as a liquid crystal display or an organic electro luminescence (EL) display and displays information based on control of the control portion 51 or the like. Also, the operation portion 54 may be configured to be integrated with the display portion 55 like a touch panel.

Also, the control unit 50 is not limited to the configuration provided in the printing unit 20 and may be provided in the supply unit 30 or the winding unit 40, or may be a configuration independently provided from the printing unit 20, the supply unit 30, and the winding unit 40. In addition, the control unit 50 at the time of controlling the winding unit 40 can be regarded as a part of the winding unit 40.

Figure 3:
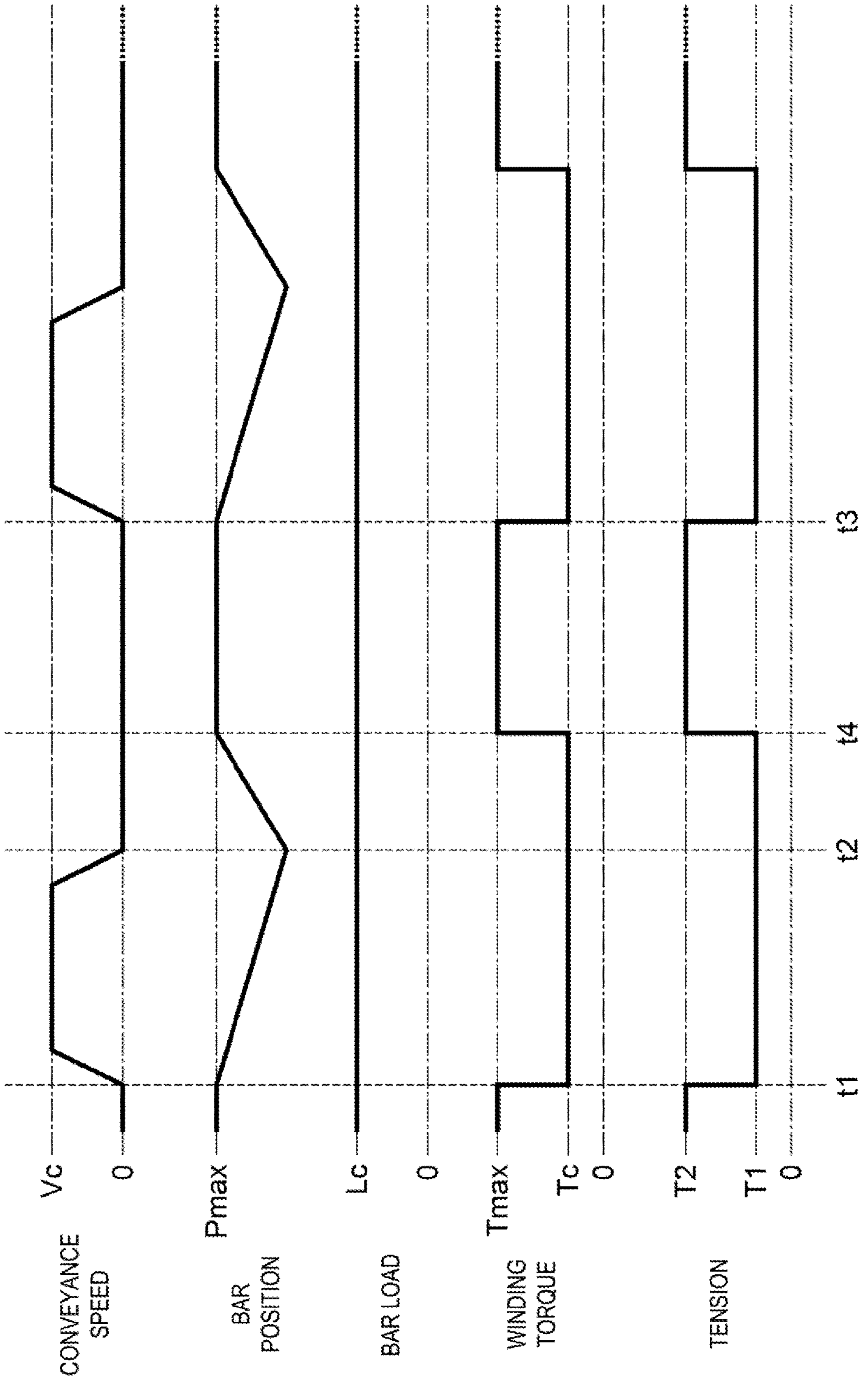
FIG. 3 is a timing chart relating to a winding operation of a winding unit.

FIG. 3 is a timing chart relating to a winding operation of the winding unit 40.

In FIG. 3, a change in a conveyance speed of the medium M in the printing unit 20 is shown at the top. The medium M is intermittently conveyed by the conveying roller pair 22 based on control of the control portion 51. In particular, the control portion 51 starts conveyance of the medium M at time t1 and stops the conveyance of the medium M at time t2 after time t1. Further, the control portion 51 resumes the conveyance of the medium M at time t3 after time t2, and thereafter repeats the same operation. Printing on the medium M is performed during a period in which the conveyance speed is 0, that is, between time t2 and time t3 when the conveyance is stopped. The control portion 51 controls the conveying roller driving mechanism 28 so that the conveyance speed of the medium M becomes a substantially constant value Vc. The value Vc is set to be higher than a winding speed when the winding roller 41 winds the medium M.

Below the conveyance speed, a change in a bar position is shown, which is a position of the swinging winding bar member 43 in the ±Z direction. The bar position is repeatedly lowered and raised with a position Pmax at which the winding bar member 43 abuts the abutting portion 46 set as an upper limit. In particular, when the conveyance of the medium M is started at time t1, the winding bar member 43 starts to descend from the position Pmax and continues to descend until the conveyance of the medium M is stopped at time t2. Thereafter, when the conveyance of the medium M is stopped, the winding performed by the winding roller 41 is continued, and thus the winding bar member 43 starts to rise. While the winding bar member 43 is rising, the winding roller 41 winds the medium M by an amount corresponding to a length of a conveyance path shortened by the rising of the winding bar member 43. Thereafter, when the winding bar member 43 abuts the abutting portion 46 at time t4 before time t3, the rising of the winding bar member 43 is stopped, and thus the conveyance of the medium M from the winding bar member 43 toward the winding roller 41 is regulated. In addition, the winding bar member 43 remains at the position Pmax until time t3 at which the conveyance of the medium M in the printing unit 20 is resumed.

Below the bar position, a change in a bar load, which is a load applied to the medium M by the winding bar member 43, is shown. The bar load is mainly determined by the own weight of the winding bar member 43 and is always a substantially constant value Lc.

Below the bar load, a change in a winding torque, which is a torque when the winding roller driving mechanism 42 rotates the winding roller 41, is shown. In a period from time t1 to time t4 during which the winding bar member 43 is not in abutment with the abutting portion 46, that is, in a period during which the winding roller 41 is winding the medium M, the winding torque is a substantially constant value Tc. On the other hand, in a period from time t4 to time t3 during which the winding bar member 43 is in abutment with the abutting portion 46, the conveyance of the medium M from the winding bar member 43 toward the winding roller 41 is regulated regardless of driving of the winding roller driving mechanism 42, and thus the winding torque reaches an upper limit value Tmax set as a torque limit. This upper limit value Tmax is set to a value at which it is possible to inhibit the slack of the medium M but it is not possible to wind the medium M while the conveyance is regulated by the abutting portion 46.

Below the winding torque, a change in tension applied to the medium M is shown. In the period from time t1 to time t4 during which the winding bar member 43 is not in abutment with the abutting portion 46, that is, in a period during which the winding performed by the winding roller 41 is proceeding, the tension applied to the medium M has a value T1 determined by the value Lc of the bar load. On the other hand, in the period from time t4 to time t3 during which the winding bar member 43 is in abutment with the abutting portion 46, that is, in the period during which the swing of the winding bar member 43 is regulated by the abutting portion 46 and thus the conveyance of the medium M toward the winding roller 41 is regulated, the tension applied to the medium M has a value T2 determined by the upper limit value Tmax of the winding torque.

In this way, the tension applied to the medium M has an appropriate value T1 at which a winding deviation can be inhibited when the medium M is wound by the winding roller 41, and has a large value T2 at which the slack of the medium M can be inhibited while the swing of the winding bar member 43 is regulated by the abutting portion 46. That is, a first state in which the medium M is wound with relatively little tension and a second state in which the conveyance of the medium M toward the winding roller 41 is regulated and then relatively much tension is applied to inhibit the slack of the medium M are alternately repeated.

As described above, according to the winding unit 40 and the printer 10 of the present embodiment, the following effects can be obtained.

According to this embodiment, the conveyance of the medium M from the winding bar member 43 toward the winding roller 41 is regulated by regulating the swing of the winding bar member 43. Thus, since much tension is applied to the medium M due to the driving force of the winding roller driving mechanism 42, it is possible to inhibit the winding deviation caused by the slack of the medium M. Further, since the conveyance of the medium M is regulated, the medium M is inhibited from being wound while much tension is applied. As a result, occurrence of wrinkles in the medium M can be inhibited.

Further, according to this embodiment, since the swing of the winding bar member 43 is regulated by the abutting portion 46 abutting the winding bar member 43 or a member coupled to the winding bar member 43, it is possible to realize regulation of the swing of the winding bar member 43 with a simple configuration.

2. Second Embodiment

Next, a printer 10 of a second embodiment will be described.

In the first embodiment, the configuration in which the tension applied to the medium M is increased from the value T1 to the value T2 by the winding bar member 43 abutting the abutting portion 46 and regulating the conveyance of the medium M toward the winding roller 41 has been adopted, but in this embodiment, the timing at which the winding bar member 43 abuts the abutting portion 46 and the timing at which the tension is increased can be arbitrarily adjusted.

Figure 4:
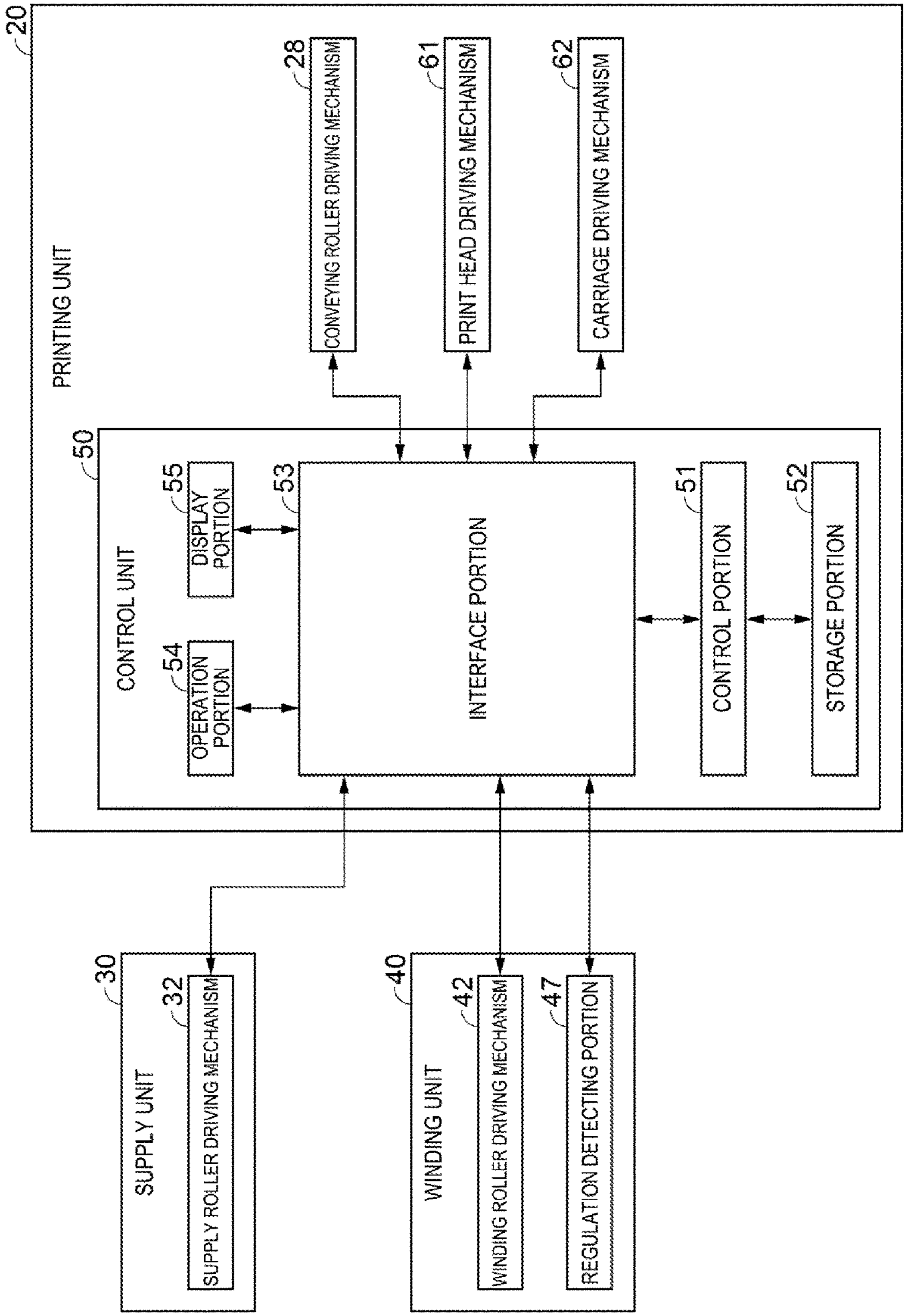
FIG. 4 is a block diagram showing a configuration of a printer according to a second embodiment.
Figure 5:
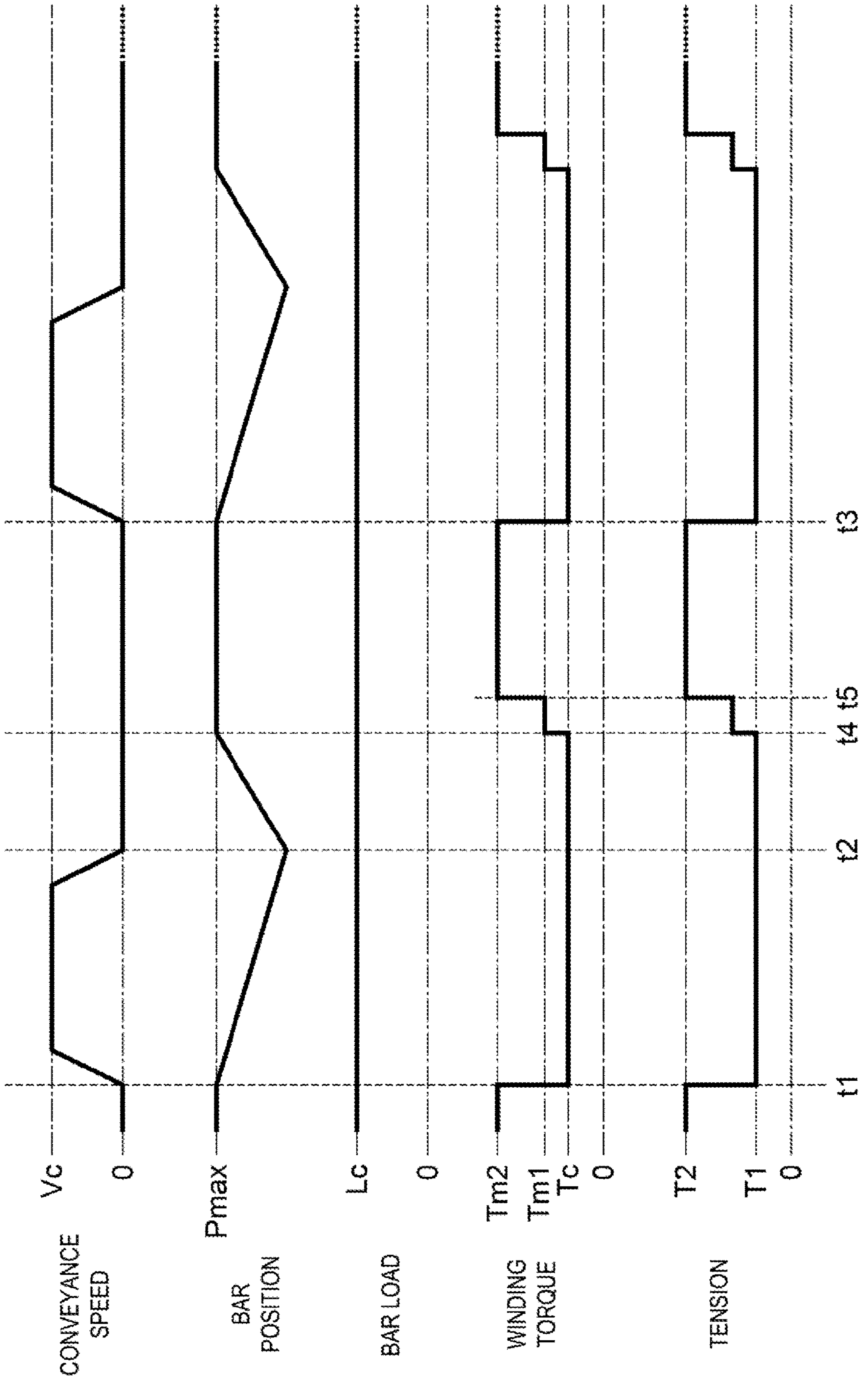
FIG. 5 is a timing chart relating to a winding operation of a winding unit according to the second embodiment.

FIG. 4 is a block diagram showing a configuration of the printer 10 according to the second embodiment, and FIG. 5 is a timing chart relating to a winding operation of the winding unit 40 according to the second embodiment.

As shown in FIG. 4, the winding unit 40 of this embodiment includes a regulation detecting portion 47 in addition to the winding roller driving mechanism 42. Other configurations are the same as those of the first embodiment and description thereof will thus be omitted.

The regulation detecting portion 47 detects that the winding bar member 43 abuts the abutting portion 46, that is, that the swing of the winding bar member 43 is regulated by the abutting portion 46, and outputs a detection signal representing the detection result to the control portion 51. Specifically, the regulation detecting portion 47 is configured by a rotary encoder that can detect a rotation angle of the second arm 45, and detects that the swing of the winding bar member 43 is regulated based on the rotation angle of the second arm 45. In other words, when the rotation angle of the second arm 45 does not change, that is, when the rotation of the second arm 45 stops, the regulation detecting portion 47 outputs a detection signal indicating that the swing of the winding bar member 43 is regulated to the control portion 51. The regulation detecting portion 47 corresponds to a first detecting portion.

Also, a configuration of the regulation detecting portion 47 is not limited to the above-described configuration. For example, the regulation detecting portion 47 may be configured by a rotary encoder that can detect a rotation angle of the winding roller 41, and may detect that the swing of the winding bar member 43 is regulated based on the rotation angle of the winding roller 41. That is, when the rotation angle of the winding roller 41 does not change, that is, when the rotation of the winding roller 41 is stopped, the regulation detecting portion 47 may output a detection signal indicating that the swing of the winding bar member 43 is regulated to the control portion 51. Alternatively, when the swing of the winding bar member 43 is regulated and the conveyance of the medium M is regulated, a load applied to the winding roller driving mechanism 42, that is, a consumption current consumed by the winding roller driving mechanism 42 increases, and thus the regulation detecting portion 47 may detect that the swing of the winding bar member 43 is regulated based on the load applied to the winding roller driving mechanism 42.

As shown in FIG. 5, in this embodiment, in a period from time t1 to time t5, which is a time between time t4 and time t3, the upper limit value Tmax of the winding torque generated by winding roller driving mechanism 42 is set to a first upper limit value Tm1 that is slightly larger than the value Tc of the winding torque assumed during winding. Then, when the winding bar member 43 abuts the abutting portion 46 and the swing is regulated at time t4, the winding torque reaches the first upper limit value Tm1.

When the regulation detecting portion 47 detects that the winding bar member 43 abuts the abutting portion 46, the control portion 51 controls the winding roller driving mechanism 42 based on the detection result. To be specific, the control portion 51 switches the upper limit value Tmax of the winding torque from the first upper limit value Tm1 to a second upper limit value Tm2 at time t5 at which a predetermined time has elapsed since the detection. The second upper limit value Tm2 is a value greater than the first upper limit value Tm1, and is a winding torque that can apply to the medium M tension having the value T2 that can inhibit the slack of the medium M. Thereafter, the control portion 51 returns the upper limit value Tmax of the winding torque from the second upper limit value Tm2 to the first upper limit value Tm1 at time t3 at which the conveyance of the medium M is resumed.

As described above, according to this embodiment, it is possible to deviate the timing (time t4) at which the swing of the winding bar member 43 is regulated from the timing (time t5) at which the tension of the medium M increases, and it is possible to more precisely adjust the tension applied to the medium M.

3. Third Embodiment

Next, a printer 10 of a third embodiment will be described.

In this embodiment, in order for the tension applied to the medium M to be a desired value in a state in which the winding bar member 43 is in abutment with the abutting portion 46, a tension detecting portion 49, which will be described below, detects the tension applied to the medium M, and the control portion 51 controls the winding torque generated by the winding roller driving mechanism 42 based on the detection result.

Figure 6:
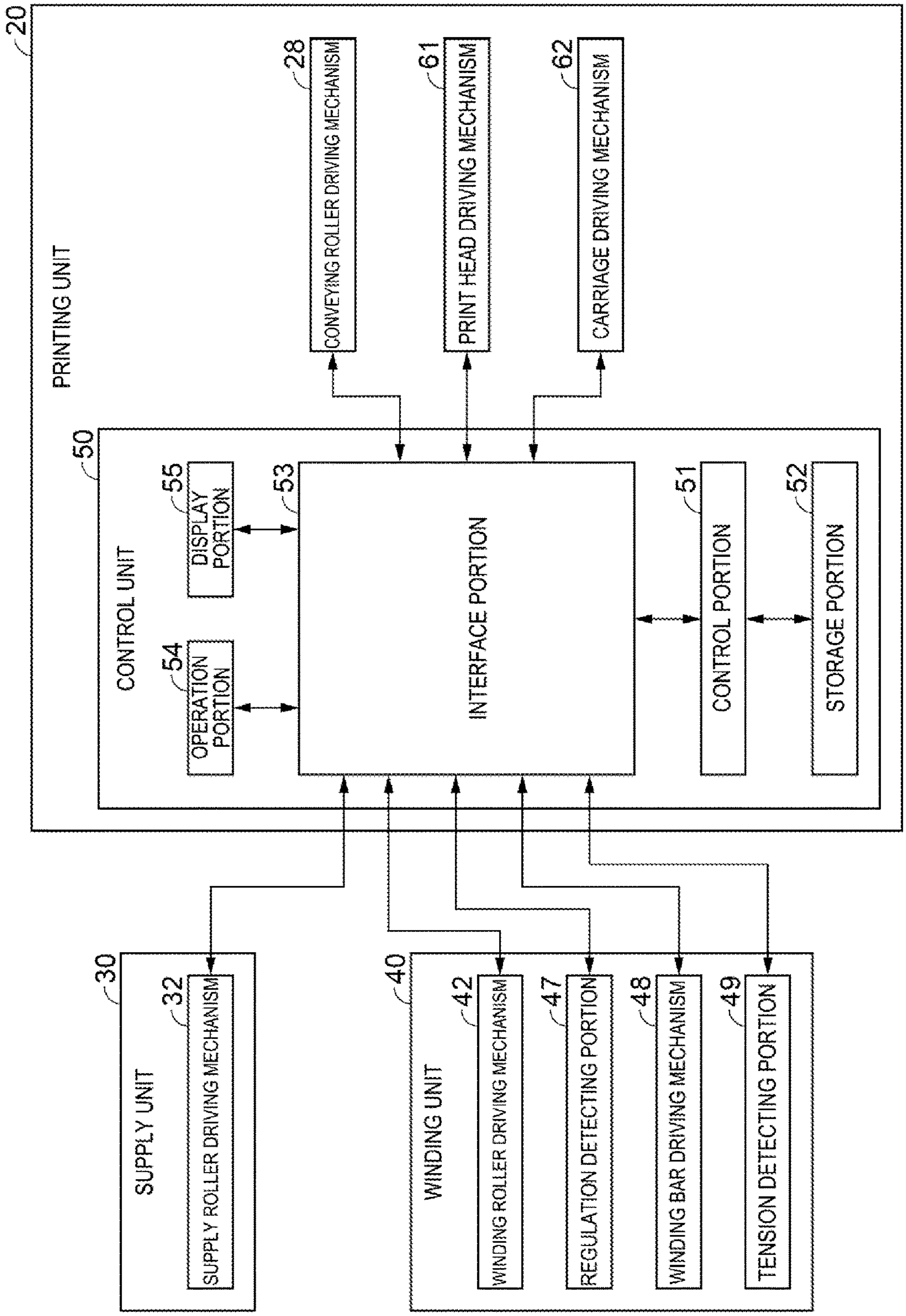
FIG. 6 is a block diagram showing a configuration of a printer according to a third embodiment.

FIG. 6 is a block diagram showing a configuration of the printer 10 of the third embodiment.

As shown in FIG. 6, the winding unit 40 of this embodiment includes a regulation detecting portion 47, a winding bar driving mechanism 48, and a tension detecting portion 49, in addition to the winding roller driving mechanism 42. Other configurations are the same as those of the first embodiment and description thereof will thus be omitted. In addition, similarly to the first embodiment, in the period from time t4 to time t3, which is a period in which winding bar member 43 abuts the abutting portion 46, the winding roller driving mechanism 42 drives the winding roller 41 with a winding torque having the upper limit value Tmax set as the torque limit.

Similarly to the second embodiment, the regulation detecting portion 47 is configured by a rotary encoder that can detect the rotation angle of the second arm 45, and detects that the swing of the winding bar member 43 is regulated based on the rotation angle of the second arm 45. In other words, when the rotation angle of the second arm 45 does not change, that is, when the rotation of the second arm 45 stops, the regulation detecting portion 47 outputs a detection signal indicating that the swing of the winding bar member 43 is regulated to the control portion 51.

The winding bar driving mechanism 48 applies a driving force for rotating the second arm 45 to the second arm 45 based on control of the control portion 51. That is, in this embodiment, it is possible to adjust the tension applied to the medium M by driving the winding bar driving mechanism 48 instead of a configuration in which the tension is applied to the medium M only by the own weight of the winding bar member 43. The winding bar driving mechanism 48 corresponds to an arm driving portion.

The tension detecting portion 49 detects tension applied to a portion of the medium M between the winding bar member 43 and the winding roller 41 and outputs the detected tension to the control portion 51. Specifically, since a load applied to the winding bar driving mechanism 48, that is, a consumption current consumed by the winding bar driving mechanism 48, increases in accordance with the tension applied to the medium M, the tension detecting portion 49 detects the tension based on the load applied to the winding bar driving mechanism 48. The tension detecting portion 49 corresponds to a second detecting portion.

The control portion 51 causes the tension detecting portion 49 to detect the tension each time the regulation detecting portion 47 detects that the swing of the winding bar member 43 is regulated. Specifically, when the winding bar member 43 moving in the +Z direction abuts the abutting portion 46 and the swing of the winding bar member 43 is regulated, and this is detected by the regulation detecting portion 47, the control portion 51 controls the winding bar driving mechanism 48 to slightly move the winding bar member 43 in the −Z direction. In addition, the tension detecting portion 49 detects the tension applied to the medium M based on the load applied to the winding bar driving mechanism 48 when the winding bar member 43 is separated from the abutting portion 46 even a little. The separation of the winding bar member 43 from the abutting portion 46 can be detected by a rotary encoder constituting the regulation detecting portion 47.

Then, the control portion 51 controls the winding roller driving mechanism 42 based on a difference between the detected tension and a predetermined target value. To be specific, the target value is set to a relatively large value T2 at which the slack of the medium M can be inhibited, and the control portion 51 updates the upper limit value Tmax of the winding torque based on the difference between the detected tension and the target value so that a value of the tension applied to the medium M becomes the value T2, and sets it to the winding roller driving mechanism 42. The control portion 51 repeats this operation each time the regulation detecting portion 47 detects that the swing of the winding bar member 43 is regulated.

As described above, according to this embodiment, each time the regulation detecting portion 47 detects that the swing of the winding bar member 43 is regulated, the control portion 51 causes the tension detecting portion 49 to detect the tension of the medium M, and controls the winding roller driving mechanism 42 based on the difference between the detected tension and the predetermined target value. Thus, it is possible to inhibit deviation of the tension applied to the medium M from the target value.

Each of the above embodiments may be modified as follows.

In the second and third embodiments, the configuration of the regulation detecting portion 47 is not limited to the configuration exemplified above. For example, the regulation detecting portion 47 may include a load sensor that can detect a load, and may detect that the winding bar member 43 abuts the abutting portion 46, that is, that the swing of the winding bar member 43 is regulated, by detecting the load applied from the winding bar member 43 to the abutting portion 46.

In addition, in this configuration, since the load detected by the load sensor varies in accordance with the tension applied to the medium M, the tension detecting portion 49 according to the third embodiment may detect the tension based on the load detected by the load sensor. According to this configuration, the regulation detecting portion 47 and the tension detecting portion 49 can have a common configuration, and thus the configuration of the device can be simplified. Further, in a configuration in which the abutting portion 46 abuts the first member coupled to the winding bar member 43, the load sensor detects a load applied from the first member to the abutting portion 46. Also, the regulation detecting portion 47 according to the second and third embodiments and the tension detecting portion 49 according to the third embodiment can be realized by various known technologies in addition to the above-described configurations, and any technology may be adopted.

In each of the above-described embodiments, the configuration in which the swing of the winding bar member 43 is regulated by the winding bar member 43 abutting the abutting portion 46 has been described, but the configuration is not limited thereto. For example, in the configuration including the above-described winding bar driving mechanism 48, the control portion 51 may be configured to control the winding bar driving mechanism 48 to lock the swing of the winding bar member 43. In this case, the control portion 51 and the winding bar driving mechanism 48 correspond to a regulating portion.

Figure 7:
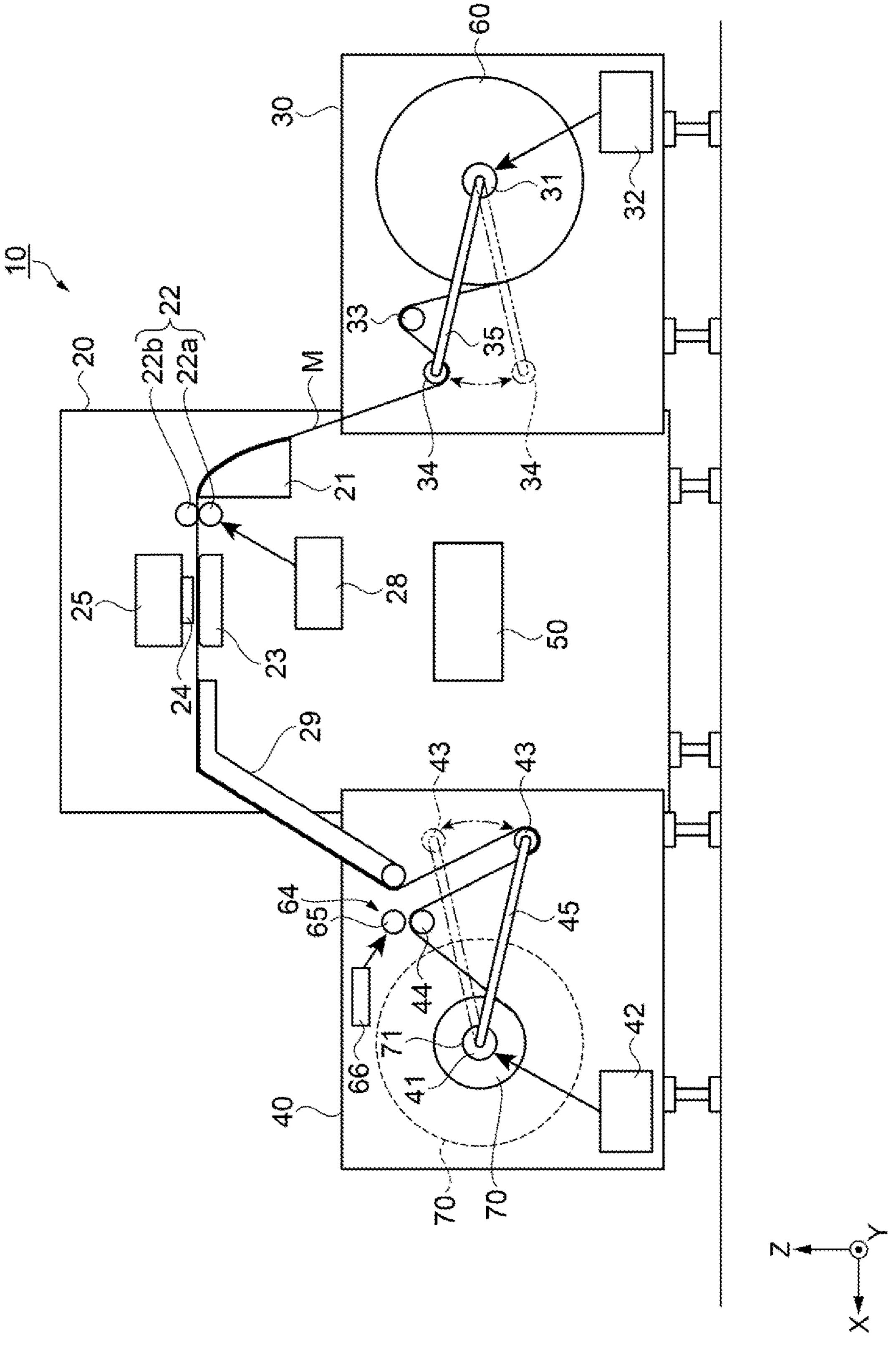
FIG. 7 is a schematic cross-sectional view showing a configuration of a printer according to a modified example.

Also, as shown in FIG. 7, in the conveyance path between the winding bar member 43 and the winding roller 41, a nip mechanism 64 that can nip the medium M may be disposed, and a nip driving portion 66 that switches the state between a state in which the nip mechanism 64 nips the medium M and a state in which it releases the nipping of the medium M based on control of the control portion 51 may be disposed. When the medium M is nipped by the nip mechanism 64, the conveyance of the medium M from the winding bar member 43 toward the winding roller 41 is regulated, and thus the swing of the winding bar member 43 is regulated.

In the example shown in FIG. 7, the nip mechanism 64 is configured by the winding guide member 44 and a non-rotatable nip roller 65, and the nip driving portion 66 switches the state between a state of causing the nip roller 65 to abut the medium M and a state of causing the nip roller 65 to be separated from the medium M. In this case, the control portion 51, the nip mechanism 64, and the nip driving portion 66 correspond to the regulating portion, and the nip mechanism 64 corresponds to a nip portion. According to this configuration, since the nip mechanism 64 regulates the swing of the winding bar member 43 by nipping the medium M between the winding bar member 43 and the winding roller 41, it is possible to reduce a load on the winding bar member 43 around which the medium M is wound.

Also, instead of the configuration in which the state in which the nip mechanism 64 nips the medium M and the state in which the nipping of the medium M is released are switched to each other, a state in which the nip roller 65 rotates in accordance with the conveyance of the medium M and a state in which the conveyance of the medium M is regulated by regulating a driven rotation of the nip roller 65 may be switched to each other while the state in which the nip mechanism 64 nips the medium M is maintained. In addition, the nip mechanism 64 is not limited to the configuration including the winding guide member 44, and may be disposed at a position different from the winding guide member 44. Further, in addition to the above, the abutting portion 46 may be a movable type, and a state in which the abutting portion 46 abuts the winding bar member 43 and a state in which the abutting portion 46 is separated from the winding bar member 43 may be switched to each other based on control of the control portion 51.

In the third embodiment, the control portion 51 may change the target value of the tension applied to the medium M in accordance with a type of the medium M. In this case, the control portion 51 may specify the type of the medium M using a sensor that can detect the type of the medium M, or may cause the user to input the type of the medium M via the operation portion 54. According to this configuration, it is possible to apply appropriate tension to the medium M in accordance with the type of the medium M.

In the third embodiment described above, the control portion 51 may change the target value of the tension applied to the medium M in accordance with a winding diameter of the medium M in the winding roller 41, that is, the roll diameter of the print medium roll 70 that increases with the progress of winding. Specifically, since wrinkles are less likely to occur in the medium M as the roll diameter increases, it is desirable that the control portion 51 decrease the target value as the roll diameter increases. In this case, the control portion 51 may specify the roll diameter using a sensor that can detect the roll diameter of the print medium roll 70, or may estimate the roll diameter based on an accumulated conveying distance or the like. According to this configuration, it is possible to apply appropriate tension to the medium M in accordance with the roll diameter of the print medium roll 70.

In the above-described embodiments, the case in which the winding roller 41 has a cylindrical shape has been exemplified, but the winding roller 41 may not have a cylindrical shape as long as the winding roller 41 can support and rotate the roll core 71.

In the above-described embodiments, the printer 10 is a device that performs printing on the medium M, and may be a serial printer, a lateral printer, a line printer, a page printer, or the like. Further, a printing method is not limited to the inkjet method, and a thermal method, a dot-impact method, a laser method, or the like may be employed.

In this embodiment described above, a configuration in which the winding unit 40 disposed downstream from the printing unit 20 winds the medium M printed on by the printing unit 20 has been described, but the use of the winding unit 40 is not limited thereto. For example, it may be used to form the medium roll 60 mounted in the supply unit 30, that is, the medium roll 60 on which the medium M before printing is wound.

The contents derived from the embodiments will be described below.

The winding device is a winding device that winds an intermittently conveyed medium, and includes a winding roller that winds the medium, a winding driving portion that applies a driving force for rotating the winding roller, a tension bar that is swingably provided upstream from the winding roller and applies tension to the medium by pressing the medium, and a regulating portion that regulates swing of the tension bar.

According to this configuration, conveyance of the medium from the tension bar toward the winding roller is regulated by regulating swing of the tension bar. Thus, since much tension is applied to the medium due to the driving force of the winding driving portion, it is possible to inhibit a winding deviation caused by the slack of the medium. Further, since the conveyance of the medium is regulated, winding of the medium with much tension applied thereto is inhibited. As a result, it is possible to inhibit occurrence of wrinkles in the medium.

In the above winding device, the regulating portion may include an abutting portion disposed so as to abut the swinging tension bar or a first member coupled to the tension bar, and the tension bar or the first member may abut the abutting portion to regulate the swing of the tension bar.

According to this configuration, since the regulating portion regulates the swing of the tension bar due to the abutting portion abutting the tension bar or the first member, it is possible to realize the regulation of the swing of the tension bar with a simple configuration.

In the above winding device, the regulating portion may include a nip portion that nips the medium between the tension bar and the winding roller, and the nip portion may nip the medium to regulate the conveyance of the medium, thereby regulating the swing of the tension bar.

According to this configuration, since the regulating portion regulates the swing of the tension bar by nipping the medium between the tension bar and the winding roller, it is possible to reduce a load on the tension bar around which the medium is wound.

The above winding device may further include a first detecting portion that detects that the swing of the tension bar is regulated by the regulating portion, and a control portion that controls the winding driving portion based on the detection result of the first detecting portion.

According to this configuration, it is possible to deviate the timing at which the swing of the tension bar is regulated from the timing at which the tension of the medium increases, and it is possible to more precisely adjust the tension applied to the medium.

The winding device may further include a second detecting portion that detects tension applied to a portion of the medium between the tension bar and the winding roller, wherein the control portion may cause the second detecting portion to detect the tension each time the first detecting portion detects that the swing of the tension bar is regulated and control the winding driving portion based on a difference between the detected tension and a predetermined target value.

According to this configuration, it is possible to inhibit a deviation of the tension applied to the medium from the target value.

The above winding device may further include an arm that supports the tension bar and an arm driving portion that applies a driving force for rotating the arm, wherein the first detecting portion may detect that the swing of the tension bar is regulated by the regulating portion based on a rotation angle of the arm, and the second detecting portion may detect the tension based on a load applied to the arm driving portion.

According to this configuration, the first detecting portion and the second detecting portion can be realized with a simple configuration.

In the above winding device, the regulating portion may include an abutting portion disposed so as to abut the swinging tension bar or a first member coupled to the tension bar, the tension bar or the first member may abut the abutting portion to regulate the swing of the tension bar, the first detecting portion may detect that the swing of the tension bar is regulated by the regulating portion by detecting a load applied to the abutting portion from the tension bar or the first member, and the second detecting portion may detect the tension based on the detected load.

According to this configuration, the first detecting portion and the second detecting portion can have a common configuration, and the configuration of the device can be simplified.

In the winding device, the control portion may change the target value in accordance with a type of the medium.

According to this configuration, it is possible to apply appropriate tension to the medium in accordance with the type of the medium.

In the winding device, the control portion may change the target value in accordance with a winding diameter of the medium in the winding roller.

According to this configuration, it is possible to apply appropriate tension to the medium in accordance with the winding diameter of the medium.

A printing device includes a conveying portion that intermittently conveys a medium, a printing portion that performs printing on the medium, a winding roller that winds the medium on which printing is performed, a winding driving portion that applies a driving force for rotating the winding roller, a tension bar that is swingably provided upstream from the winding roller and applies tension to the medium by pressing the medium, and a regulating portion that regulates swing of the tension bar.

According to this configuration, the conveyance of the medium from the tension bar toward the winding roller is regulated by regulating the swing of the tension bar. For this reason, since much tension is applied to the medium due to the driving force of the winding driving portion, it is possible to inhibit a winding deviation caused by the slack of the medium. Further, since the conveyance of the medium is regulated, the winding of the medium with much tension applied thereto is inhibited. As a result, it is possible to inhibit occurrence of wrinkles in the medium.

What is claimed is:

1. A winding device that winds an intermittently conveyed medium, comprising:

a winding roller that winds the medium;

a winding driving portion that applies a driving force for rotating the winding roller;

a tension bar that is swingably provided upstream from the winding roller and applies tension to the medium by pressing the medium; and a regulating portion that regulates a swing of the tension bar, wherein the regulating portion includes an abutting portion disposed so as to abut the portion of the tension bar that contacts the medium when the tension bar presses the medium, and the portion of the tension bar that contacts the medium abuts the abutting portion to regulate the swing of the tension bar.

2. The winding device according to claim 1, wherein the regulating portion includes a nip portion that nips the medium between the tension bar and the winding roller, and the nip portion nips the medium to regulate the conveyance of the medium, thereby regulating the swing of the tension bar.

3. The winding device according to claim 1 further comprising:

a first detecting portion that detects that the swing of the tension bar is regulated by the regulating portion; and a control portion that controls the winding driving portion based on the detection result of the first detecting portion.

4. The winding device according to claim 3 further comprising a second detecting portion that detects tension applied to a portion of the medium between the tension bar and the winding roller, wherein the control portion causes the second detecting portion to detect the tension each time the first detecting portion detects that the swing of the tension bar is regulated and control the winding driving portion based on a difference between the detected tension and a predetermined target value.

5. The winding device according to claim 4 further comprising:

an arm that supports the tension bar; and an arm driving portion that applies a driving force for rotating the arm, wherein the first detecting portion detects that the swing of the tension bar is regulated by the regulating portion based on a rotation angle of the arm, and the second detecting portion detects the tension based on a load applied to the arm driving portion.

6. The winding device according to claim 4, wherein the regulating portion includes an abutting portion disposed so as to abut the swinging tension bar or a first member coupled to the tension bar, the tension bar or the first member abuts the abutting portion to regulate the swing of the tension bar, the first detecting portion detects that the swing of the tension bar is regulated by the regulating portion by detecting a load applied to the abutting portion from the tension bar or the first member, and the second detecting portion detects the tension based on the detected load.

7. The winding device according to claim 4, wherein the control portion changes the target value in accordance with a type of the medium.

8. The winding device according to claim 4, wherein the control portion changes the target value in accordance with a winding diameter of the medium in the winding roller.

9. A printing device comprising:

a conveying portion that intermittently conveys a medium;

a printing portion that performs printing on the medium;

a winding roller that winds the medium on which printing is performed;

a winding driving portion that applies a driving force for rotating the winding roller;

a tension bar that is swingably provided upstream from the winding roller and applies tension to the medium by pressing the medium; and a regulating portion that regulates swing of the tension bar, wherein the regulating portion includes an abutting portion disposed so as to abut the portion of the tension bar that contacts the medium when the tension bar presses the medium, and the portion of the tension bar that contacts the medium abuts the abutting portion to regulate the swing of the tension bar.

* * * * *